United States Patent [19]

Costello et al.

[11] 3,945,806

[45] Mar. 23, 1976

[54] REACTOR-GENERATOR

[75] Inventors: Norman F. Costello; Neal A. Cook, both of Racine, Wis.

[73] Assignee: Modine Manufacturing Company, Racine, Wis.

[22] Filed: Apr. 18, 1974

[21] Appl. No.: 461,857

[52] U.S. Cl.................................. 23/290; 23/284
[51] Int. Cl.².......................... B01J 3/04; B01J 1/00
[58] Field of Search.......... 23/288 L, 290, 289, 284; 138/37, 40, 42, 114; 165/142; 122/318, 319

[56] References Cited
UNITED STATES PATENTS

| | | | |
|---|---|---|---|
| 1,893,492 | 1/1933 | Brill ................................. | 23/289 X |
| 2,887,365 | 5/1959 | Rycker et al. .................... | 23/289 X |
| 2,985,506 | 5/1961 | Vita et al. ....................... | 23/277 R X |
| 3,149,176 | 9/1964 | Glazier et al. .................... | 23/290 X |
| 3,313,599 | 4/1967 | Boon................................. | 23/290 |
| 3,547,890 | 12/1970 | Yamada et al.................... | 23/284 X |
| 3,607,125 | 9/1971 | Kydd.............................. | 165/142 X |

*Primary Examiner*—Joseph Scovronek
*Assistant Examiner*—Arnold Turk
*Attorney, Agent, or Firm*—Wegner, Stellman, McCord, Wiles & Wood

[57] ABSTRACT

A high temperature reactor-generator apparatus comprising a pressure vessel defined by walls including side walls with the vessel including a lower section and an upper section, a conduit member or tube within the vessel having sides spaced from the pressure walls and open upper and lower ends, a partition intermediate the upper and lower ends of the conduit spanning the space between the vessel and the conduit and dividing the vessel into an upper reactor chamber and a lower reactor chamber, heating means for supplying heat to the lower reactor chamber adjacent to the bottom thereof, restricted flow means for providing a restricted flow passage dividing the lower reactor chamber into an intermediate preheat section essentially above the heating means and a heating section essentially at the heating means, fluid introducing means for introducing a fluid reactant medium into the intermediate section for flow in the intermediate section, through the restricted passage into the heating passage and upwardly in the conduit into the upper reactor chamber and means for moving the reaction products from the upper reactor chamber.

12 Claims, 2 Drawing Figures

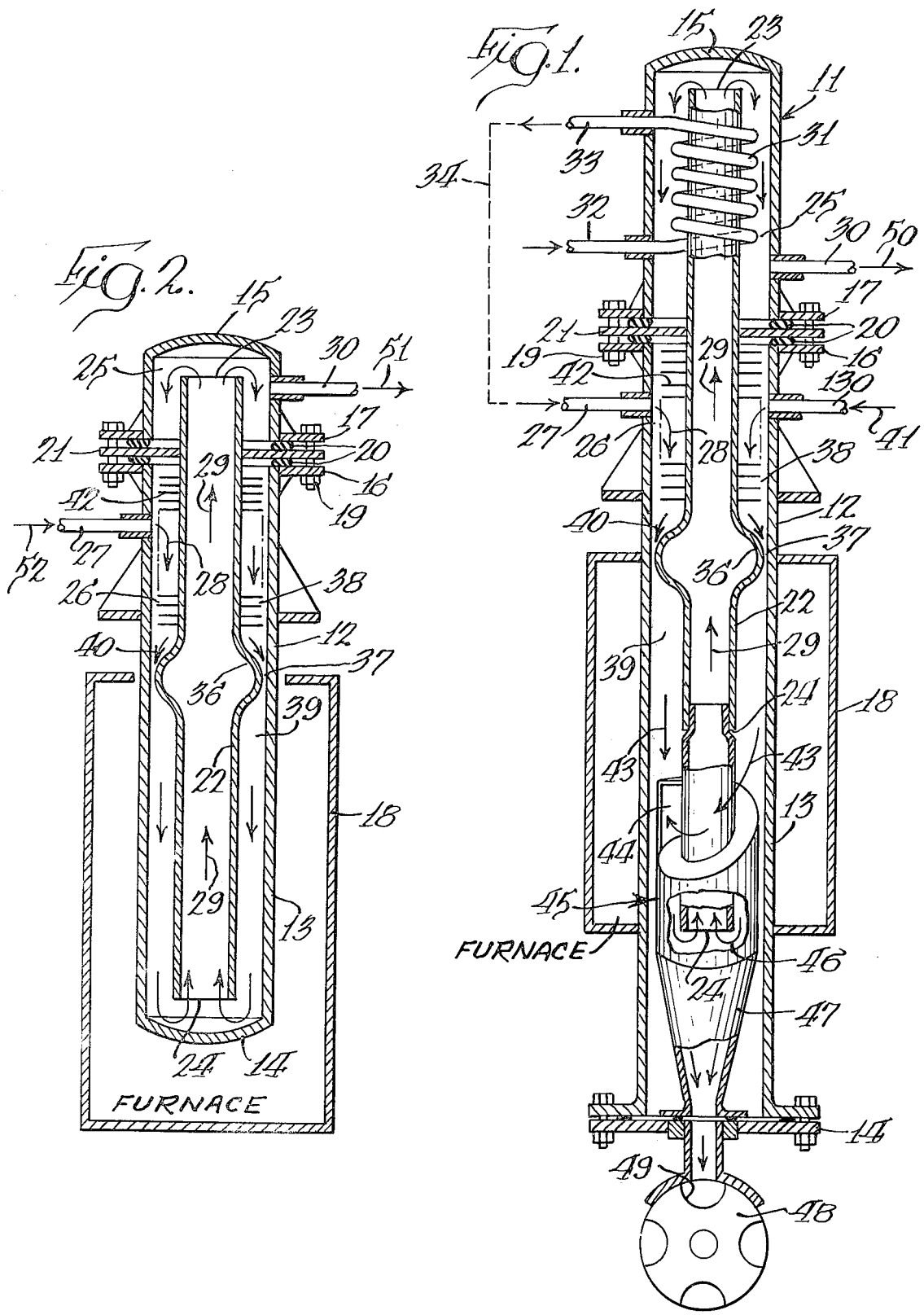

REACTOR-GENERATOR

BACKGROUND OF THE INVENTION

This invention relates to a reactor-generator apparatus for providing gaseous reaction products from feed material in which a baffle and a restricted flow orifice divides the apparatus into an intermediate preheat section or chamber, a heating section at a heating means to receive heat therefrom, an upper reactor chamber and means for introducing a reaction medium into the intermediate preheat section and for withdrawing reaction products from the upper reactor chamber.

The invention also relates to an apparatus of this type in which a solid fuel is converted to a gaseous and a solid reaction product together with means for separating the solid reaction product and disposing of it externally of the apparatus.

BRIEF DESCRIPTION OF THE DRAWINGS

FIG. 1 is a vertical sectional view partially in side elevation of one embodiment of the invention.

FIG. 2 is a view similar to FIG. 1 but illustrating a second embodiment of the invention.

DESCRIPTION OF THE PREFERRED EMBODIMENTS

The apparatus of this invention includes a reactor 10 that is generally similar to the one shown, described and claimed in our copending application Ser. No. 447,503, filed Mar. 4, 1974. This reactor as illustrated in both figures of this application comprises a pressure vessel 11 that in these embodiments is vertically elongated and including an integral section 12 comprising a cylindrical section 13 provided with a bottom 14.

At the top of the vessel 11 is a cap section 15 that is provided with an annular mounting flange 17 which cooperates with a parallel mounting flange 16 on the adjacent end of the cylindrical section 13. The lower end of this cylindrical section 13 is in communication with a furnace shown schematically at 18 for receiving heat therefrom.

The cylindrical section 13 and the cap section 15 are resiliently connected together by spaced bolts 19 that interconnect the mounting flanges 16 and 17 and press the flanges 16 and 17 against resilient gaskets 20 that are on opposite sides of a mounting flange 21 that is attached to a vertical conduit or tube 22. This tube has a top end 23 adjacent to the cap section 15 and a bottom end 24 that is adjacent to the bottom 14 of the pressure vessel 11.

As can be seen from this description and the accompanying drawings the pressure vessel 11 is defined by walls including the side walls of the cap section 15 and the aligned side walls of the bottom section 13. The conduit or tube 22 within the vessel has the upper 23 and lower 24 ends and its cylindrical sides spaced from these pressure vessel walls. These ends of the tube are open for fluid flow therethrough as indicated by the arrows in FIGS. 1 and 2.

The mounting flange 21 for the tube functions as a partition intermediate the upper and lower ends that span the reactor space defined by the pressure vessel 11 and tube 22 that divides the space into an upper reactor chamber 25 and lower reactor chamber 26.

The apparatus includes means illustrated by the pipe 27 for introducing a fluid reactant medium into the lower reactor chamber 26 for flow through this chamber as indicated by the arrows 28 and then upwardly through the conduit member or tube 22 as indicated by the arrows 29. This flow upwardly through the tube 22 is into the upper chamber 25 by way of the open upper end 23 of the tube.

The furnace 18 supplies heat to the lower end of the apparatus and means comprising the tube 30 are provided for removing the reaction products from the upper reactor chamber 25.

The apparatus is also provided with means for flowing a fluid in heat exchange relationship with the upper reactor chamber 25. In the embodiment of FIG. 1 this means comprises a helical coil 31 arranged around the tube 22 within the upper reactor chamber 25 and substantially concentric with but spaced from the tube and the cap section 15. This coil 31 has an inlet 32 and an outlet 33 so that passage of a fluid through the coil 31 is in heat exchange relationship with the fluids in the upper reactor chamber 25. This not only serves to heat the fluid flowing through the coil 31 but also to cool the reaction products before they leave the reactor through the pipe 30. This of course greatly simplifies the external cooling requirements that would be necessary to cool the reaction products.

The heated fluid flowing from the coil 31 through the outlet 33 may be disposed of in any manner desired. As is illustrated by the dotted line 34 this fluid may be a reactant such as water which is directed into the lower reactor chamber 26 along with the other reactants that are introduced by way of the pipe 27. Thus the dotted line 34 is merely a schematic illustration of a manner in which the heated fluid from the coil 31 may be utilized.

The tube or conduit 22 in the area adjacent the top of the furnace 18 is expanded into an annular enlargement 36 that extends to adjacent the bottom cylindrical section 13 of the vessel 11 to provide a circular restricted flow orifice 37 or passage dividing the lower reactor chamber 26 into an intermediate preheat section 38 that is essentially above the furnace 18 and a lower heating section 39 that is essentially at the furnace 18 to receive heat directly therefrom.

Located at the intermediate section 38 is the tube 130 which functions as a fluid introducing means for introducing a fluid reactant medium such as mixed coal particles and air into the intermediate preheat section 38. This mixture is directed downwardly as indicated by the arrows 28 through the flow restrictor circular orifice 37 as indicated by the arrows 40 and into the heating section 39 where the most intense heat is applied directly by the furnace 18.

In its flow through the preheat section 38 the fluid reactant mixture 41 is preheated by contact with heat exchange baffles 42 on the tube 22 and within the section 38.

The reactant mixture during its flow downwardly in the heating section 39 as indicated by the arrows 43 reacts to generate the gas reaction products and a solid reaction product which in the case of coal would of course be ash. This mixture of reaction products is directed at the bottom of the vertical tube 22 into the entrance 44 to a centrifugal separator 45 and upwardly therein into the lower end 24 of the tube or conduit member 22.

In the separator 45 the solids are separated from the upwardly flowing gases 46 in the customary manner and the solids drop through the usual inverted conical section of the separator into a rotary valve 48 of the customary type having the usual series of pockets 49 which permit disposing of the solid residue while maintaining a seal to prevent the entry of ambient air.

FIG. 2 illustrates a second embodiment of the invention wherein both the reactants and the reaction products are fluids. In both embodiments similar parts are identified by the same numerals.

In this invention the apparatus can be used to produce a burnable gas reaction product 50 and 51 where the reactant mixture 41 is a finely divided organic solid such as coal, scrap polymers or the like as in the embodiment of FIG. 1. In the embodiment of FIG. 2 the reactant mixture 52 may be a gas or a liquid such as oil and water which can be supplied to the reactor at ordinary room temperature and which will be converted into the reaction product 51 at a temperature of about 250°F. for example.

A typical spacing to provide the orifice 37 would be 1/16 inch for a 2-½ inch diameter tube 22 which would provide a flow rate through the orifice of about 1000 feet per minutes. Also, if desired, the orifice can be provided by having grooves (not shown) at a 45° angle to the horizontal spaced about ¼ inch apart and each 1/16 inch deep by 1/16 inch wide.

The structure of this invention provides a series of reaction sections here shown as two identified at 38 and 39. Obviously, by providing more restricted flow areas 36 the successive sections could be any number desired.

One of the important advantages of this invention is that the apparatus is ideally usable for the generation of oil-gas with a given range of feed stocks because this apparatus provides two separated reaction zones which permit different processes to occur in series in the two zones. Thus the initial reaction will take place in the bottom reactor chamber 26, will continue while flowing downwardly and then initially through the tube 22 with the reactants receiving heat from the furnace and then continuing the reaction in a final chamber illustrated by the upper reactor chamber 25. Thus with this apparatus ideal temperatures can easily be maintained throughout the reactor to promote the best reaction or in the oil and gas example to provide the best ratio of carbon, hydrogen and oxygen produced. This proper temperature can, of course, be maintained by proper heat input, a controlled heat transfer surface area, a calculated cooling medium flow inside of the apparatus and other controllable variables, all as well known to those skilled in the art. Typical temperatures within the apparatus may vary from about 1000°F. to as much as 2500°F. or even lower or higher where such temperatures are required in the particular process.

Typical uses of the high temperature reactor-generator apparatus of this invention are for reforming hydrocarbons into gaseous fuel products or feed stocks, dissociation of ammonia, partial oxidation of distillable and gaseous hydrocarbon feeds, high temperature catalytic reforming and the like.

The illustrated embodiment in the drawings shows only a single stage reactor. It is evident, however, to those skilled in the art that the invention may be readily applied to reactors in which a plurality of reactors are used either in parallel, series or parallel and series combined gas generating operations.

Furthermore, although the vessel is shown in generally upright position the reactor could also be used inverted from the position of the drawings or in horizontal or angular position. In both embodiments, the hot gases 29 flowing in the metal tube 22 serve to supply heat to the preheat zone 38.

Having described our invention as related to the embodiments shown in the accompanying drawings, it is our intention that the invention be not limited by any of the details of description, unless otherwise specified, but rather be construed broadly within its spirit and scope as set out in the appended claims.

We claim:

1. A high temperature reactor-generator apparatus, comprising: a pressure vessel defined by walls including side walls, said vessel including a lower section and an upper section; a conduit member within said vessel having sides spaced from the pressure vessel walls and open upper and lower ends; a combined partition means and mounting flange for said conduit member located intermediate to said upper and lower ends of said conduit member and extending to said side walls and spanning the space between the vessel and the conduit member for dividing the vessel into an upper reactor chamber located laterally outwardly of said conduit member upper end and a lower reactor chamber, said lower section and said upper section comprising said lower and upper reactor chambers; resilient sealing means for resiliently sealing together said partition means and said upper and lower vessel sections; heating means for supplying heat to said lower reactor chamber adjacent to the bottom end thereof; restricted flow means for providing a restricted flow passage dividing said lower reactor chamber into an intermediate, preheat section essentially above said heating means and a heating section essentially at said heating means; fluid introducing means for introducing a fluid reactant medium into said intermediate, preheat section for flow in said intermediate, preheat section, through said restricted passage into said heating section and upwardly in said conduit member into said upper reactor chamber; and means for removing reaction products from said upper reactor chamber.

2. The apparatus of claim 1 wherein said restricted flow means comprises an integral section of said conduit member and the adjacent portion of said chamber wall.

3. The apparatus of claim 2 wherein said integral section comprises an annular portion of said conduit member.

4. The apparatus of claim 1 wherein said introducing means comprises means for introducing a solid reactant and a fluid reactant into said intermediate section and means are provided at the bottom of said heating section for removing solid reaction products.

5. The apparatus of claim 4 wherein said means for removing said solid reaction products comprises a gas-solids separator located at the bottom of said conduit member for separating solids from gases prior to said gases passing upwardly in said conduit member.

6. The apparatus of claim 5 wherein said solids separator comprises a centrifugal separator having a solids outlet at the bottom thereof.

7. The apparatus of claim 1 wherein there are provided means for flowing a fluid in heat exchange relationship with said upper reactor chamber.

8. The apparatus of claim 7 wherein said fluid introducing means comprises a helical coil in said upper reactor chamber having an inlet and an outlet and comprising means for preheating said reactant medium, said coil outlet communicating with said lower reactor chamber for introducing said reactant medium thereto.

9. The apparatus of claim 8 wherein said intermediate section is provided with means for introducing a second reactant medium into said intermediate section.

10. The apparatus of claim 7 wherein said means for flowing said fluid comprises a conduit in said upper chamber.

11. The apparatus of claim 10 wherein said conduit comprises a coil located in said upper reactor chamber surrounding said conduit member.

12. The apparatus of claim 11 wherein said coil is substantially concentric with said conduit member and said pressure vessel.

* * * * *